UNITED STATES PATENT OFFICE.

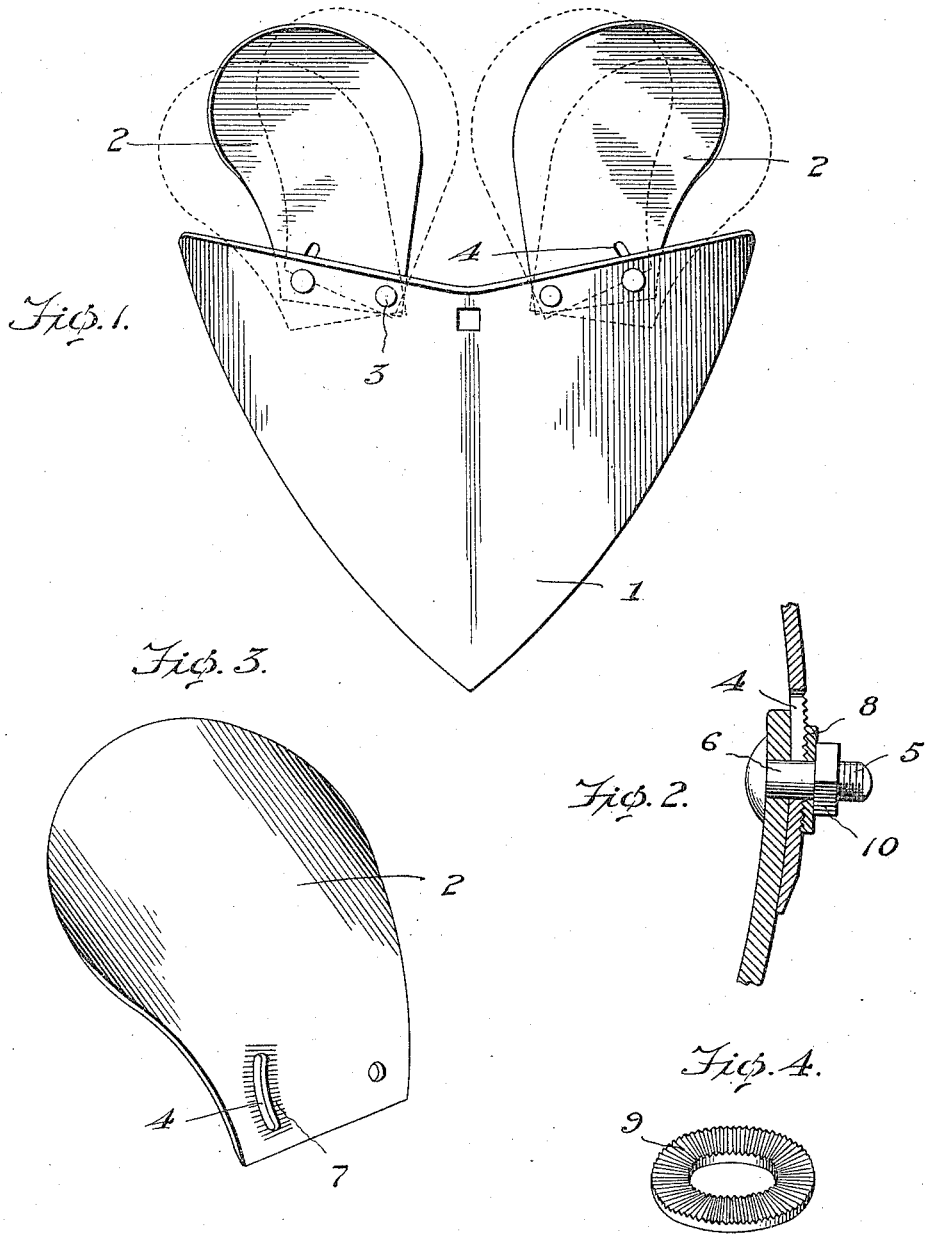

JAMES A. CASSTEPHENS, OF SAGERTON, TEXAS.

SWEEP-WING ATTACHMENT FOR PLOWS.

1,184,823.  Specification of Letters Patent.  Patented May 30, 1916.

Application filed May 28, 1914. Serial No. 841,629.

*To all whom it may concern:*

Be it known that I, JAMES A. CASSTEPHENS, citizen of the United States, residing at Sagerton, in the county of Haskell and State of Texas, have invented certain new and useful Improvements in Sweep-Wing Attachments for Plows, of which the following is a specification.

My invention relates to cultivators and plows, and more particularly to an improved sweep wing adjustable relatively to the shovel or plow blade to vary the throw of the disrupted soil.

As its primary object, the invention contemplates a sweep wing structure, such in its nature as to direct the dry or top soil toward the middle of the furrow plowed, the underneath or moist soil being directed toward each side of the shovel and against the wings, the latter throwing the soil laterally of the furrow and against the seeds or row of plants between which the plow or cultivator is operated.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a front elevation of a cultivator shovel or plow blade illustrating the manner in which the sweep wings are attached thereto; Fig. 2 is an enlarged fragmentary sectional view showing the manner in which the wings are held in the desired adjusted position; Fig. 3 is a detail perspective view of one of the wings; and Fig. 4 is a similar view of the washer employed to hold the wings immovable when adjusted.

Before proceeding with the description of the drawings, I desire to call particular attention to the fact that while I have evolved my invention with particular reference to its application in connection with the blade or shovel of a plow or cultivator, the same may be readily utilized as an attachment for other farming implements where it is desired that the soil be directed as will hereinafter appear.

Referring now to the drawings by numerals, 1 designates the shovel of an ordinary cultivator or plow to which the sweep wings each designated as an entirety by the numeral 2 are attached, the said wings being so shaped as to direct the top or dry soil disrupted by the shovel toward the center of the furrow plowed, the said top or dry soil passing over the top edge of the shovel and between the wings, while the underneath or moist soil is directed toward the upper outside edges of the shovel and guided, by the formation of the wings, toward the seeds or plants against which it is thrown during the advancement of the cultivator or plow.

To provide for adjustment of the wings 2, the said wings are pivoted, one at each side of the center of the shovel and adjacent to the top edge thereof as indicated at 3, the pivot pin passing through the wings as shown. Each wing is provided with an arcuate slot 4 through which a bolt 5 passes, the head of the bolt being upon the working surface of the shovel and extending through an opening 6 of the shovel blade as shown to advantage in Fig. 2. The outside face of each wing 2, adjacent the arcuate slot 4, is corrugated or serrated as indicated at 7, the serrated surface providing a means whereby a washer 8, one face of which is serrated or corrugated as indicated at 9 is held immovable when pressed into engagement with the surface 7 through the medium of a nut 10 threaded upon the bolt 5 as shown.

When it is desired that the wings 2 be adjusted to assume various positions indicated by the dotted lines in Fig. 1, nut 10 is loosened and the said wings swung laterally or moved relatively to each other upon the pivot pin designated 3, and, when so adjusted, nut 10 is again tightened causing the serrated or corrugated face of washer 8 to engage the corrugated surface of the wings, the engagement, when the nut is sufficiently tightened, preventing displacement of the wings or movement relatively to the shovel 1 to which they are attached.

From the foregoing, taken in connection with the accompanying drawings it is apparent that by the formation of the wings as shown to advantage in Fig. 3, the top or dry soil is directed toward the center of the soil plowed, the said soil passing over the top edge of the shovel between the wings, while the underneath or moist soil, as it is thrown toward the opposite edges of the shovel during the advancement of the plow, is directed, by the wings 2 over the top edge of the shovel at each side thereof and against the seeds or plants in the manner above described, the dry or top soil filling the furrow and preventing a falling back of the moist soil into the furrow, thereby holding the said moist soil as desired.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having thus fully described my invention, what I claim as new and desire to secure by Letters Patent, is:—

1. An attachment for plow shovels including a sweep wing substantially concavo-convex in its formation, the convexed face of the wing being toward the working face of the shovel to direct the soil disrupted thereby either toward the middle of the furrow cut, away from the furrow cut, or both.

2. In means for directing the top soil disrupted by a plow shovel toward the middle of the furrow plowed and the underneath soil toward each of the furrow sides consisting of a sweep wing comprising a single concavo-convex blade flattened at one end, means pivotally attaching the blade to the shovel, the convexed face of the blade being toward the working face of the shovel, and means for adjusting the blade relatively to the shovel to gage the throw of the disrupted soil.

3. An attachment for plow shovels including a pair of substantially concavo-convex sweep wings, disposed, one at each side of the center of the plow shovel adjacent the top edge thereof, the convex face of each sweep wing being toward the working face of the plow, and means to relatively adjust the sweep wings for directing the disrupted soil either toward the center of the furrow, away from the furrow, or partly away and partly toward the center of the furrow.

In testimony whereof I affix my signature in presence of two witnesses.

JAMES A. CASSTEPHENS.

Witnesses:
W. H. LITTLEFIELD,
E. B. LITTLEFIELD.